United States Patent [19]

Sikma et al.

[11] 4,106,203
[45] Aug. 15, 1978

[54] GARDEN ROW MARKER

[76] Inventors: William J. Sikma, 307 S. Line St.;
Ronald J. Pease, 707 Jeffery Ct., both
of Columbia City, Ind. 46725

[21] Appl. No.: 833,741

[22] Filed: Sep. 16, 1977

[51] Int. Cl.² .............................................. B43L 7/00
[52] U.S. Cl. ...................................... 33/86; 242/96;
242/100; 254/161
[58] Field of Search ............... 111/1, 2; 47/33, 1,
47/45, 46, 47; 254/161, 162, 163, 164; 33/137
R, 137 L, 138, 85, 86; 256/37, 38, 39, 40, 41, 42,
43, 44; 272/3, 4, 100, 101; 273/29 BC, 29 BD,
31; 242/96, 99, 100, 100.2, 106

[56] References Cited
U.S. PATENT DOCUMENTS

| 26,743 | 1/1860 | Beardsley | 47/45 |
|---|---|---|---|
| D. 153,485 | 4/1949 | Warren | 33/86 X |
| 603,157 | 4/1898 | Spitzenberg | 33/86 |
| 691,521 | 1/1902 | Bandemer | 254/161 |
| 736,100 | 8/1903 | Hostettler | 111/2 |
| 908,927 | 1/1909 | Woitynek | 242/100 |
| 1,017,061 | 2/1912 | Patric | 242/96 |
| 1,183,351 | 5/1916 | De Roy | 33/180 R |
| 1,871,483 | 8/1932 | Uitendaal | 242/96 |
| 1,933,163 | 10/1933 | Coplen | 242/96 |
| 2,107,989 | 2/1938 | Kuhn | 33/86 |
| 2,236,305 | 3/1941 | Ahlin | 242/100 |
| 2,555,457 | 6/1951 | Rose | 254/161 X |
| 2,836,897 | 6/1958 | Gooley | 33/86 |
| 3,397,485 | 8/1968 | Peterson | 47/47 |

FOREIGN PATENT DOCUMENTS

| 2,269,300 | 11/1975 | France | 47/46 |
|---|---|---|---|
| 317,687 | 8/1929 | United Kingdom | 273/29 |

Primary Examiner—Edgar S. Burr
Assistant Examiner—James R. Feyrer
Attorney, Agent, or Firm—McDougall, Hersh & Scott

[57] ABSTRACT

A garden row marker includes a pair of stakes having ledges to facilitate insertion into the ground. A marking cord is attached to one of the stakes while a take-up reel is secured to the other stake on which the balance of the cord is wound. A reversing roll is provided adjacent the take-up reel. The cord passes from the reel around the reversing roll and back into physical contact with the supply of cord wound on the reel. This is effective for securing the reel after a desired length of cord has been dispensed. This arrangement eliminates the need for any locking or spring biased means to maintain the marking cord taut.

8 Claims, 4 Drawing Figures

GARDEN ROW MARKER

BACKGROUND OF THE DISCLOSURE

This invention relates to the field of agricultural tools. More specifically, it relates to tools for use with small home gardens or for lawn care. The invention provides a means of laying out straight rows of vegetables in a vegetable garden or of trimming a lawn edge neatly and accurately. Similarly, the device can be used for surveying, sports purposes to mark out the dimensions of a playing field, and similar uses.

Prior devices for marking garden rows have employed locking means or spring biasing means for maintaining the cord taut between a pair of stakes. Failure to provide such a locking means results in a less than satisfactory device. Exemplary of the prior art devices of which applicant is aware are U.S. Pat. Nos. 603,157, D-153,485, and 1,183,351. In the first mentioned patent a spiral spring is employed to maintain the cord taut. In the design patent referenced there appears to be no tensioning means whatsoever. In the last mentioned reference four stakes are employed to form a rectangular layout and no tensioning means is required.

By contrast, the present invention maintains the marking cord in a taut position without the need for a spring tensioning means or a locking means, such as a ratchet and pawl, on the take-up reel. The present invention employs a reversing roll provided adjacent the take-up reel for feeding the cord back up over the reel and into contact with the surplus cord on the reel. The frictional engagement caused thereby is effective for maintaining the cord taut. Thus, a low cost and highly efficient garden row marker is provided. To facilitate entry of the stakes into the ground at the desired location step ledges are provided as part of the stakes. The stakes are pressed into the ground by stepping upon the ledges.

It is accordingly an object of the present invention to provide an improved garden row marker capable of maintaining the marking cord taut without the need for a locking or spring biased mechanism.

It is another object of the invention to provide a garden row marker having a step ledge to facilitate entry of the stakes into the ground.

Another object of the invention is to provide means for permitting adjustment of the height of the marking cord whereby the device may be used for purposes other than garden row marking as, for example, trimming the edge of the lawn.

Other objects and advantages of the invention will be apparent from the remaining portion of the specification.

DETAILED DESCRIPTION

Figure 1:
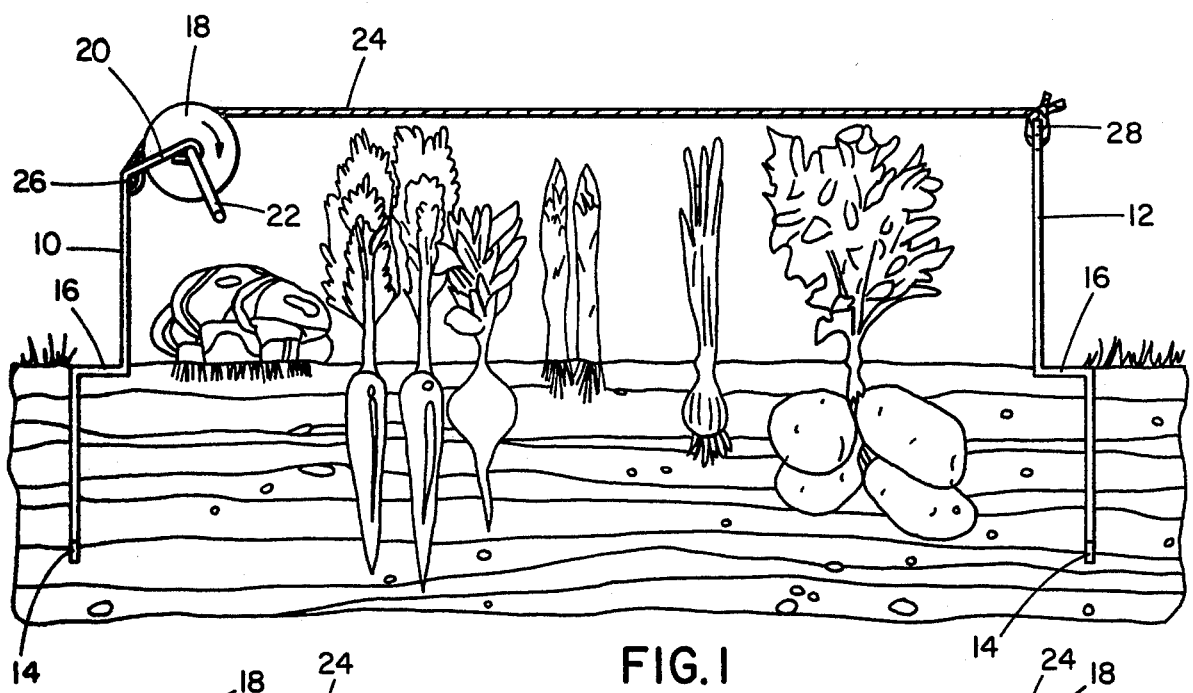
FIG. 1 is a pictorial drawing illustrating the use of the garden marker according to the invention.
Figure 2:
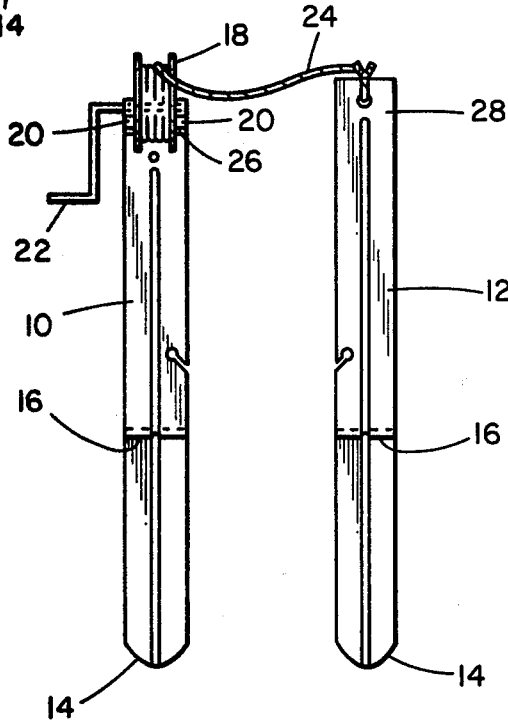
FIG. 2 is a front elevation of the stakes and take-up reel according to the invention.
Figure 3:
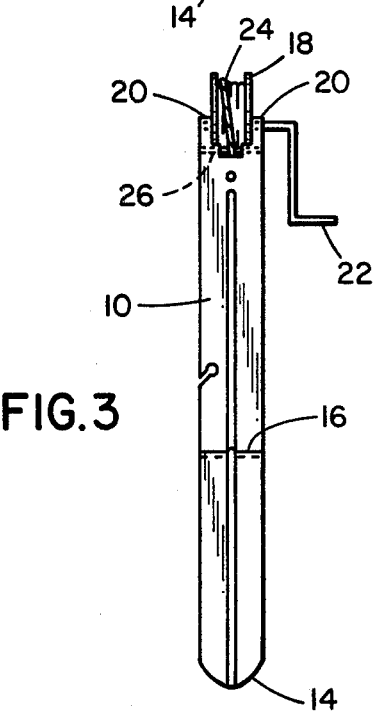
FIG. 3 is a rear elevation of the take-up reel stake according to the invention.

Referring to FIGS. 1 through 3, the invention is illustrated. The garden row marker includes a pair of stakes 10 and 12. Each stake is provided with a pointed end 14 for insertion into the ground which insertion is facilitated by the provision of a step ledge 16. Ledge 16 is provided preferably about midway between the pointed end 14 and the top of the stake. The ledge is dimensioned to facilitate pressure from the foot of the user. Stake 10, sometimes referred to as the take-up reel stake, is provided with a take-up reel 18 secured to a pair of arms 20 extending upwardly at an angle to the vertical from the top of the stake on either side of the reel. The reel 18 is operated by means of a hand crank 22 and is provided with a supply of marking cord 24 sufficient for the intended use.

Figure 4:
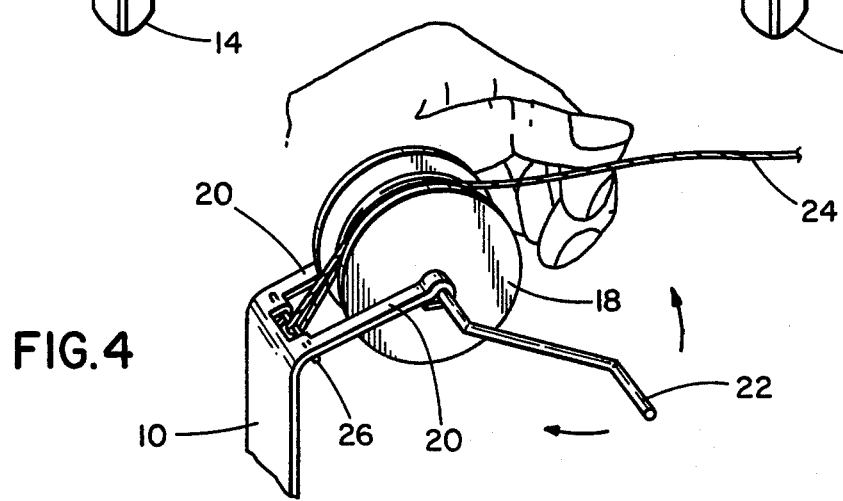
FIG. 4 illustrates the operation of the take-up reel and reversing roll.

According to the invention the cord is initially wound on the take-up reel in a clockwise direction as viewed in FIG. 1 and as indicated by the arrow. After winding, the loose end of the cord is then passed downwardly and beneath a reversing roll 26 preferably located at the point where the arms 20 attach to the stake 10. The cord passes under the reversing roll and then upwardly back to the take-up reel. The loose end of the marking cord is then secured to the receiving stake 12 through an aperture 28 provided at the top portion thereof. The reversing roll may be any suitable cylindrical member, preferably of metal, and may be rotatably secured or fixedly secured to the stake 10, as desired. In either case the cord will freely pass around the roll during winding and unwinding operations to be described. A principal feature of the invention is the locking or tensioning obtained by use of the reversing roll for passing the cord back across the take-up reel. This eliminates the need for a spring tensioning means or a reel locking device. By virtue of the angular position of arms 20 and the position of the reversing roll 26, as the cord passes upwardly from the roll it rests securely on the unused cord coiled on the take-up reel. Since the cord was wound on the reel 18 in a clockwise direction, to unwind cord from the reel requires a counterclockwise rotation of the reel as viewed in FIG. 1. Such movement is vigorously resisted by the portion of the cord which is doubled back over the reversing roll and onto the take-up reel. Thus, once stakes have been positioned as desired the crank 22 can be operated to take up any excess cord (FIG. 4). Loosening of the cord is then resisted by the feature just described thereby maintaining the row marker in the desired taut condition to permit planting of straight rows of vegetables or for the other purposes previously referred to.

Referring to FIG. 4, the manner in which the tensioning mechanism operates is illustrated. When the cord is in the loose condition and it is desired to tighten it the crank is operated in the clockwise direction. As the excess cord is taken up the unreeled cord is drawn down tightly against the reel thus securing it against counterclockwise movement. In order to release the cord from this condition it is necessary to manually lift the cord up and away from the take-up reel thereby releasing the restricting action of the unreeled cord on the reel and permitting additional lengths of cord to be played out from the reel as desired.

The angle at which the arms 20 are disposed with respect to the vertical is not critical. However, this angle and the location of the roll 26 and reel 18 must be such that the cord passing upwardly from the reversing roll is firmly pressed against the cord wound on the reel in order to effect the locking action described.

As indicated in FIGS. 2 and 3, the stakes 10 and 12 may be provided with apertures 30 along a middle portion thereof just above ground level. A slot 32 connects the aperture to the outside of the stake so that the marking cord 24 can be inserted into the aperture when desired. This action serves two functions. First, it lowers the height of the marking cord so that the cord may be employed for certain purposes, such as, marking an athletic field with lime or trimming the edge of a lawn. Secondly, with respect to stake 10, it provides further security against loosening of the marking cord by increasing the amount of unwound cord pressing on the reel to prevent movement.

While we have shown and described embodiments of this invention in some detail, it will be understood that this description and illustrations are offered merely by way of example, and that the invention is to be limited in scope only by the appended claims.

We claim:

1. A garden row marker comprising:
   (a) a supply of marking cord,
   (b) a pair of stakes having pointed lower ends for inserting into the ground,
   (c) a reel rotatably attached to the upper end of one of said stakes for storing said cord thereon,
   (d) means for securing the free end of said cord to the upper portion of the other of said stakes,
   (e) a reversing roll provided on the upper end of said one stake positioned beneath said reel, said roll adapted to permit the free end of said cord to pass downwardly from said reel and around said roll, back up to said reel for engagement with the remaining cord supply on said reel, and finally to the securing means on said other stake,
   whereby the cord may be unwound from said reel to define a straight line of a desired length between said pair of stakes, said reel being secured against further unwinding by said engagement between the unwound portion of said cord and said remaining supply on said reel.

2. The device according to claim 1 wherein said stakes further include a step ledge adapted to support the shoe of a user thereon to facilitate insertion of said pointed lower ends into the ground.

3. The device according to claim 1 wherein said reel includes a hand operated crank for winding said cord on said reel.

4. The device according to claim 1 wherein said securing means is an aperture provided in the upper portion of said other stake, said cord being passed through said aperture and tied.

5. The device according to claim 1 wherein said marker further includes a pair of upwardly extending arms provided at the top of said one stake, one arm on either side of said reel, said reel being secured to said arms.

6. The device according to claim 5 wherein said arms are positioned at an acute angle to the vertical direction when said one stake is positioned vertically.

7. The device according to claim 1 wherein said marker further includes means for adjustably positioning the cord height with respect to the top of said stakes.

8. The device according to claim 7 wherein said position means includes at least one aperture provided through each of said stakes at a point intermediate its ends and a channel connecting the aperture to the side of said stake whereby the cord may be inserted into the aperture to adjust the height at which the cord is supported by said stake.

* * * * *